US012008950B1

(12) United States Patent
Zhong et al.

(10) Patent No.: US 12,008,950 B1
(45) Date of Patent: Jun. 11, 2024

(54) DISPLAY PANEL AND DISPLAY APPARATUS

(71) Applicant: Xiamen Tianma Display Technology Co., Ltd., Xiamen (CN)

(72) Inventors: Chen Zhong, Xiamen (CN); Meng Lai, Xiamen (CN); Qiang Chen, Xiamen (CN); Dipeng Li, Xiamen (CN); Jingxiong Zhou, Xiamen (CN); Zhiqiang Xia, Xiamen (CN)

(73) Assignee: XIAMEN TIANMA DISPLAY TECHNOLOGY CO., LTD., Xiamen (CN)

( * ) Notice: Subject to any disclaimer, the term of this patent is extended or adjusted under 35 U.S.C. 154(b) by 0 days.

(21) Appl. No.: 18/121,030

(22) Filed: Mar. 14, 2023

(30) Foreign Application Priority Data

Dec. 29, 2022 (CN) ........................ 202211712551.1

(51) Int. Cl.
*G09G 3/32* (2016.01)

(52) U.S. Cl.
CPC ....... *G09G 3/32* (2013.01); *G09G 2300/0452* (2013.01); *G09G 2300/0842* (2013.01); *G09G 2310/0267* (2013.01); *G09G 2310/0286* (2013.01); *G09G 2310/08* (2013.01); *G09G 2330/021* (2013.01)

(58) Field of Classification Search
CPC ............. G09G 3/32; G09G 2300/0452; G09G 2300/0842; G09G 2310/0267; G09G 2310/0286; G09G 2310/08; G09G 2330/021
See application file for complete search history.

(56) References Cited

U.S. PATENT DOCUMENTS

| | | | | |
|---|---|---|---|---|
| 2019/0228712 A1* | 7/2019 | Li | ........................ | G09G 3/3266 |
| 2019/0279574 A1* | 9/2019 | Kim | ..................... | G09G 3/3266 |
| 2022/0293033 A1* | 9/2022 | Kim | ..................... | G09G 3/2003 |
| 2022/0335894 A1* | 10/2022 | Zhou | .................... | G09G 3/3266 |
| 2023/0059117 A1* | 2/2023 | Yang | .................... | G09G 3/3208 |

* cited by examiner

*Primary Examiner* — Amit Chatly
(74) *Attorney, Agent, or Firm* — East IP P.C.

(57) ABSTRACT

The present application discloses a display panel and a display device. The display panel includes: a plurality of sub-pixels arranged in a plurality of rows and in a plurality of columns, wherein at least one column of the sub-pixels includes sub-pixels of at least two colors; gate drivers at least including a first gate driver and a second gate driver, wherein the first gate driver includes a plurality of first shift register units in a cascaded connection, the second gate driver includes a plurality of second shift register units in a cascaded connection, the first shift register units and the second shift register units are electrically connected to the sub-pixels in different rows, respectively, and color arrangements of the sub-pixels in adjacent pixel rows in response to a first gate driving signal output by a first gate driver are the same.

13 Claims, 14 Drawing Sheets

DISPLAY PANEL AND DISPLAY APPARATUS

CROSS-REFERENCE TO RELATED APPLICATION

This application claims priority to Chinese Patent Application No. 202211712551.1, filed on Dec. 29, 2022, which is incorporated herein by reference in its entirety.

TECHNICAL FIELD

The present application relates to the field of display technology, and particularly to a display panel and a display apparatus.

BACKGROUND

With the development of display technology, users have more and more requirements on the performance of a display panel, for example, the users require the display panel to have low power consumption. Therefore, how to reduce the power consumption of a display panel becomes a focus of research in the art.

SUMMARY

Embodiments of the present application provide a display panel and a display apparatus.

In one aspect, the embodiments of the present application provide a display panel a including plurality of sub-pixels arranged in a plurality of rows and in a plurality of columns, wherein at least one column of the sub-pixels includes sub-pixels of at least two colors; gate drivers at least including a first gate driver and a second gate driver, wherein the first gate driver includes a plurality of first shift register units in a cascaded connection, the second gate driver includes a plurality of second shift register units in a cascaded connection, the first shift register units and the second shift register units are electrically connected to the sub-pixels in different rows, respectively, and color arrangements of the sub-pixels in adjacent pixel rows in response to a first gate driving signal output by a first gate driver are the same, and color arrangements of the sub-pixels in adjacent pixel rows in response to a second gate driving signal output by the second gate drivers are the same.

In the other aspect, based on the same inventive concept, the embodiments of the present application further provide a display apparatus including the display panel according to the embodiments of the first aspect.

BRIEF DESCRIPTION OF THE DRAWINGS

Other features, objects and advantages of the present application will become more apparent from the following detailed description of the non-limiting embodiments with reference to the drawings, in which the same or similar reference signs refer to the same or similar features, and the drawings are not drawn according to actual scale.

DETAILED DESCRIPTION

Figure 1:
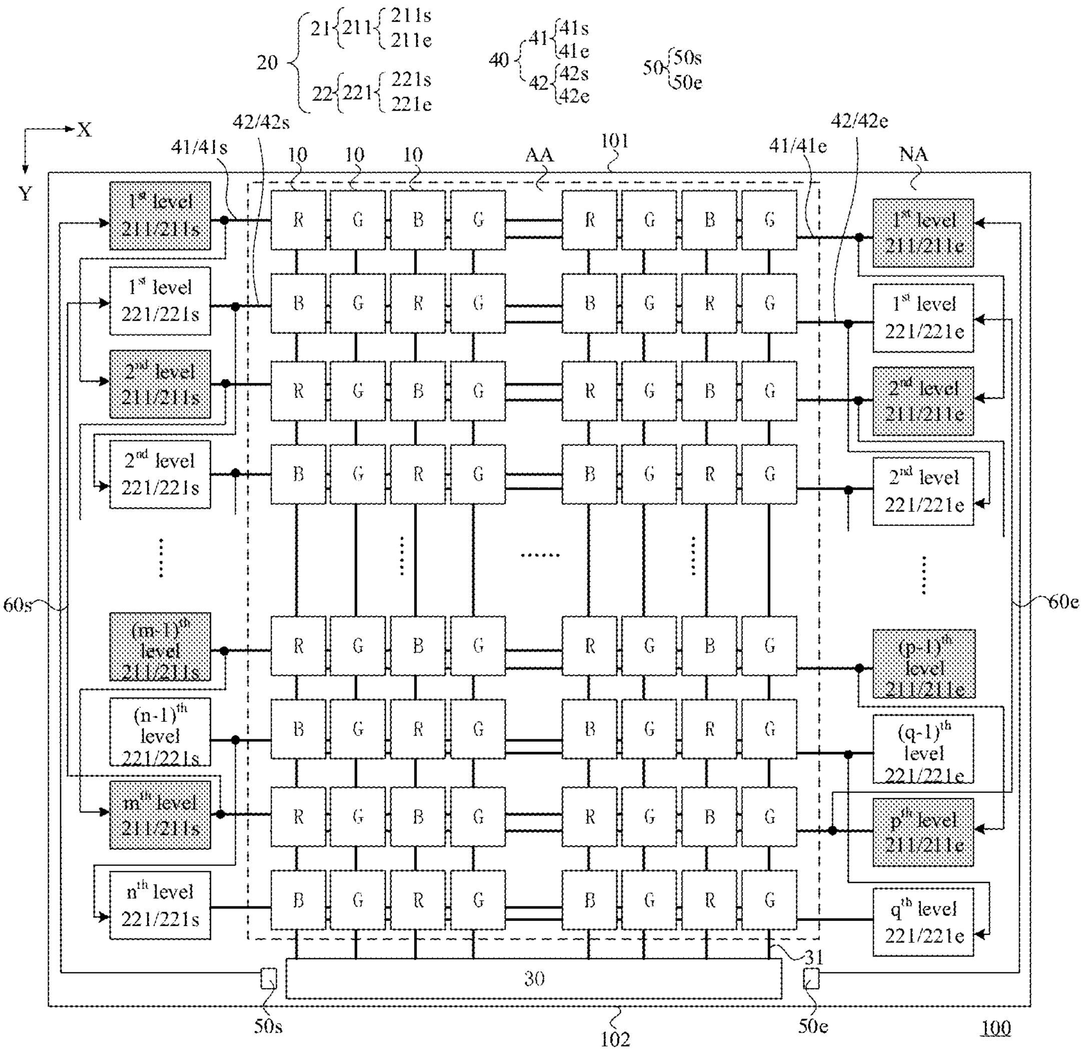
FIG. 1 shows a schematic structural diagram of a display panel according to an embodiment of the present application.

Features and exemplary embodiments of various aspects of the present application will be described in detail below. In order to make the objects, technical solutions and advantages of the present application clearer, the present application is further described in detail below with reference to the drawings and specific embodiments It should be understood that, specific embodiments described herein are merely configured to illustrate the present application, not configured to limit the present application. For those skilled in the art, the present application may be implemented without some of these specific details. The following description of the embodiments is only for providing a better understanding of the present application by illustrating examples of the present application.

It should be noted that, herein, relational terms such as “first” and “second” are used only for distinguishing one entity or operation from another entity or operation, and do not necessarily require or imply any such actual relationship or order between these entities or operations. Moreover, the terms “comprising”, “including”, or any other variation thereof, are intended to encompass a non-exclusive inclusion, such that a process, a method, an article or a device including a series of elements not only includes these elements, but also includes other elements not explicitly listed, or includes elements inherent to the process, the method, the article or the device. Without further limitation, an element preceded by "including . . . " does not exclude presence of additional similar elements in a process, a method, an article or a device including the element.

It should be noted that when the structure of a component is described, a layer/region being referred as "above" or "over" another layer/region means that the layer/region is directly above the other layer/region or other layers or regions are further included between the layer/region and the other layer/region. Moreover, if the component is turned over, the layer/region will be "under" or "below" the other layer/region.

It should be understood that, the term "and/or" used herein refers to only an association relationship for describing associated objects, which includes three possible kinds of relationships. For example, "A and/or B" may represent three possible cases including "A existing alone", "A and B existing simultaneously", and "B existing alone". In addition, the character "/" herein generally represents that there is an "or" relationship between the associated objects preceding and succeeding the character "/" respectively.

In embodiments of the present application, the term "electrical connection" may refer to a direct electrical connection between two components, or may refer to an electrical connection between two components via one or more other components.

It will be apparent to those skilled in the art that various modifications and variations can be made to the present application without departing from the gist or scope of the present application. Accordingly, the present application is intended to cover the modifications and variations of the present application that fall within the scope of the appended claims (claimed technical solutions) and their equivalents. It should be noted that, the implementations provided by the embodiments of the present application may be combined with one another without conflict.

Before describing the technical solutions provided by the embodiments of the present application, in order to facilitate the understanding of the embodiments of the present application, the present application first specifically describes the problems existing in the related art.

In the related art, gate drivers scan each row of sub-pixels progressively, and data signals are written into each row of sub-pixels progressively. For example, firstly, the gate drivers scan a first row of sub-pixels, and the data signals are written into the first row of sub-pixels; secondly, the gate drivers scan a second row of sub-pixels, and the data signals are written into the second row of sub-pixels; then, the gate drivers scan a third row of sub-pixels, and the data signals are written into the third row of sub-pixels. By analogy, the gate drivers scan a last row of sub-pixels, and the data signals are written into the last row of sub-pixels.

Through research, the inventors of the present application have found that, a same column of sub-pixels may include a plurality of colors of sub-pixels, and when a solid-colored image is displayed, different colors of sub-pixels correspond to different data signals, and thus the data signal is required to be inverted frequently, and the more times the data signal is inverted, the greater the power consumption is, which is not beneficial for reducing the power consumption.

In order to solve the above problem, embodiments of the present application provide a display panel and a display apparatus, and various embodiments of the display panel and the display device will be described below with reference to the accompanying drawings.

As shown in FIG. 1, a display panel 100 may include sub-pixels 10 and gate drivers 20. A plurality of sub-pixels 10 are arranged in a plurality of rows and in a plurality of columns. The sub-pixels 10 may include a plurality of colors of sub-pixels, different colors of sub-pixels emit different colors of light. At least one column of the sub-pixels 10 may include the sub-pixels of at least two colors.

As an example, the display panel includes first sub-pixels R, second sub-pixels B and third sub-pixels G emitting different colors of light. The first sub-pixels R may refer to sub-pixels emitting red light, the second sub-pixels B may refer to sub-pixels emitting blue light, and the third sub-pixels G may refer to sub-pixels emitting green light. Odd columns may include the first sub-pixels R and the second sub-pixels B, and even columns may include the third sub-pixels G.

The gate drivers 20 may at least include a first gate driver 21 and a second gate driver 22. The first gate driver 21 may include a plurality of first shift registers 211 in a cascaded connection, and the second gate driver 22 may include a plurality of second shift registers 221 in a cascaded connection.

The first shift register units 211 and the second shift register units 221 are electrically connected to the sub-pixels in different rows, respectively, and color arrangements of the sub-pixels in adjacent pixel rows in response to a first gate driving signal output by the first gate driver 21 are the same, and color arrangements of the sub-pixels in adjacent pixel rows in response to a second gate driving signal output by the second gate driver 22 is the same. In other words, the first gate driver 21 is electrically connected to one color of the sub-pixels in a same column of the sub-pixels, and the second gate driver 22 is electrically connected to the other color of the sub-pixels in a same column of the sub-pixels.

For example, in the same column of the sub-pixels, odd rows of the sub-pixels emit same color of light, and even rows of the sub-pixels emit same color of light. A first column of the sub-pixels are given as an example in FIG. 1, odd rows of the sub-pixels are the first sub-pixels R, and even rows of the sub-pixels are the second sub-pixels B. In the first column of the sub-pixels, odd rows of the sub-pixels may be electrically connected to the first shift register units 211, and even rows of the sub-pixels may be electrically connected to the second shift register units 221.

A same column of the sub-pixels 10 may be connected to a same data line 31, data lines 31 may be connected to a data driver 30. The data driver 30 may be used to generate data signals, and the data signals generated by the data driver 30 may be transmitted to the data lines 31. The gate drivers 20 may be used to generate gate driving signals, and the data signals on the data lines 31 may be transmitted to the sub-pixels 10 when the gate driving signals are at an ON-level.

According to the display panel provided by the embodiments of the present application, in a duration of one image frame, the first gate drivers 21 firstly scan sub-pixel rows electrically connected to the first gate drivers 21, and the second gate drivers 22 then scan sub-pixel rows electrically connected to the second gate drivers 22. Specifically, in a duration of one image frame, the plurality of first shift register units 211 of the first gate driver 21 firstly send out the first gate driving signal in sequence, and in response to the first gate driving signal, the data signals on the data lines 31 may firstly be written into the sub-pixel rows electrically connected to the first gate driver 21; the plurality of second shift register units 221 of the second gate driver 22 secondly send out the second gate driving signal, and in response to the second gate driving signal, the data signals on the data lines 31 may be written into the sub-pixel rows electrically connected to the second gate driver 22. Since the first gate driver 21 is electrically connected to one color of the sub-pixels in the same column of the sub-pixels, and the second gate driver 22 is electrically connected to the other color of the sub-pixels in the same column of the sub-pixels, when the solid-colored image is displayed, the data signal of the same color of the sub-pixels of may be the same, for example, for the first column of the sub-pixels in FIG. 1, the data signal on the data line 31 may only be required to be inverted once in a duration of one image frame, and the times of inversion of the data signal may be reduced to a minimum, which is beneficial for reducing the power consumption. In addition, reducing the times of the inversion of the data signal may also reduce electromagnetic interference, which improves display stability.

As an example, each of the gate drivers 20 may include scanning drivers and light-emitting drivers. The scanning drivers are used to provide scanning signals, and in response to the scanning signals, the data signals and reset signals, etc may be written into the sub-pixels. The light-emitting drivers are used to provide a light emitting control signal, and in response to the light emitting control signal, the sub-pixels may enter a light-emitting stage to emit light for display.

Accordingly, each of the first gate drivers 21 may include a first scanning driver and a first light-emitting driver, and each of the second gate drivers 21 may include a second scanning driver and a second light-emitting driver. Each of the first shift register units 211 may include a first shift register unit 211*s* and a first shift register unit 211*e*, and each of the second shift register units 221 may include a second shift register unit 221*s* and a second shift register unit 221*e*.

As shown in FIG. 1, the first scanning driver may include a plurality of first shift register units 211*s* in a cascaded connection, and the second scanning driver may include a plurality of second shift register units 221*s* in a cascaded connection. The first light-emitting driver may include a plurality of first shift register units 211*e* in a cascaded connection, and the second light-emitting driver may include a plurality of second shift register units 221*e* in a cascaded connection.

Figure 2:
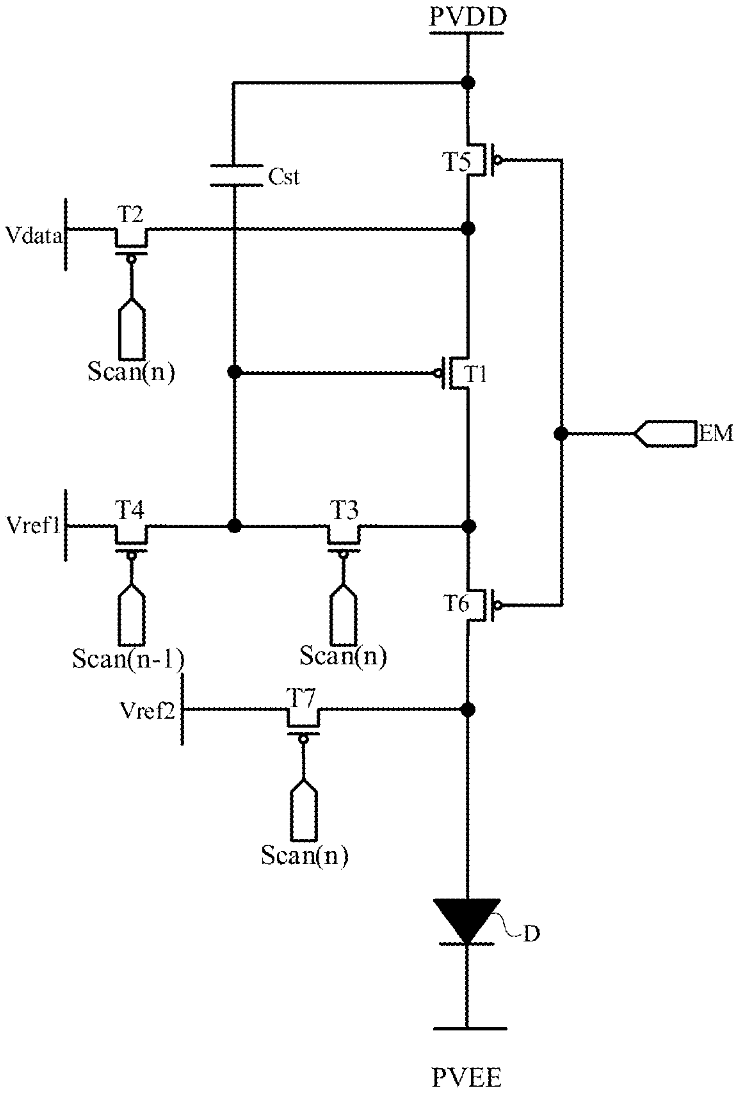
FIG. 2 shows a schematic structural diagram of a pixel circuit of a display panel according to an embodiment of the present application.

In order to a better understanding of control of the scanning drivers and the light-emitting drivers over the sub-pixels, as shown in FIG. 2, the sub-pixel may include transistors T1, T2, T3, T4, T5, T6 and T7, a storage capacitor Cst and a light-emitting diode D. In FIG. 2, scan (n−1) and scan (n) represent the scanning signals, EM represents the light emitting control signal, Vdata represents the data signal, Vref1 represents a first reset signal, Vref2 represents a second reset signal, PVDD represents a positive power signal, and PVEE represents a negative power signal.

The scanning drivers may be used to provide the scanning signals Scan (n−1) and scan (n). For example, the scanning drivers provide the scanning signal Scan (n), and when the scanning signal Scan (n) is a valid pulse, the transistors T2 and T3 are turned on, and the data signals Vdata may be written into a gate of the driving transistor T1.

The light-emitting drivers may be used to provide the light emitting control signal EM, and when the light emitting control signal EM is a valid pulse, the transistors T5 and T6 are turned on and the light-emitting diode D emits light.

Figure 3:
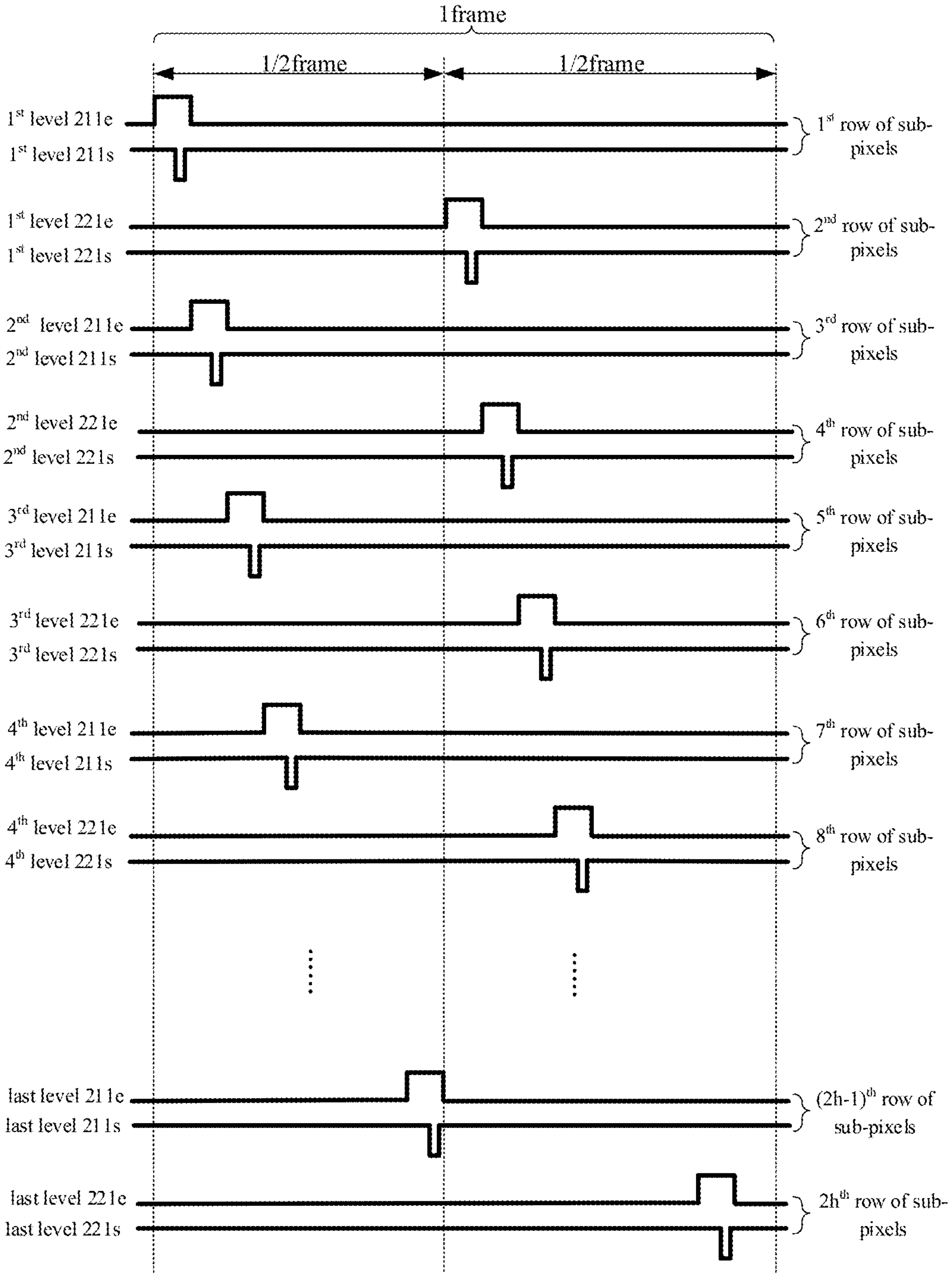
FIG. 3 shows a schematic diagram of a time sequence of output signals of gate drivers of a display panel according to an embodiment of the present application.

As an example, the plurality of first shift register units 211*s* of the first scanning drivers are electrically connected to the odd rows of the sub-pixels, the plurality of second shift register units 211*s* of the second scanning drivers are electrically connected to the even rows of the sub-pixels, the plurality of first shift register units 211*e* of the first light-emitting drivers are electrically connected to the odd rows of the sub-pixels, and the plurality of second shift register units 211*e* of the second light-emitting drivers are electrically connected to the even rows of the sub-pixels. For example, as shown in FIG. 3:

The first shift register unit 211*s* of a first level and the first shift register units 211*e* of the first level are electrically connected to the first row of the sub-pixels.

The second shift register unit 221*s* of the first level and the second shift register unit 221*e* of the first level are electrically connected to the second row of the sub-pixels.

The first shift register unit 211*s* of a second level and the first shift register unit 211*e* of the first level are electrically connected to a third row of the sub-pixels.

The second shift register unit 221*s* of the second level and the second shift register unit 221*e* of the second level are electrically connected to a fourth row of the sub-pixels.

By analogy, for example, there are 2h rows of the sub-pixels.

The first shift register unit 211*s* of a last level and the first shift register unit 211*e* of the last level are electrically connected to a $(2h-1)^{th}$ row of the sub-pixels.

The second shift register unit 221*s* of the last level and the second shift register unit 221*e* of the last level are electrically connected to the second row of the sub-pixels.

In a first ½ frame of one frame, the plurality of first shift register units 211*s* may scan the first row, the third row, a fifth row . . . and the $(2h-1)^{th}$ row of the sub-pixels in the odd rows in sequence, and the plurality of first shift register units 211*e* may scan the first row, the third row, the fifth row, a seventh row . . . and the $(2h-1)^{th}$ row of the sub-pixels in the odd rows in sequence. In a second ½ frame of one frame, the plurality of second shift register units 221*s* may scan the second row, the fourth row, a sixth row, an eighth row . . . and a $2h^{th}$ row of the sub-pixels in the even rows in sequence, and the plurality of second shift register units 211*e* may scan the second row, the fourth row, the sixth row, the eighth row . . . and the $2h^{th}$ row of the sub-pixels in the even rows in sequence.

Figure 4:
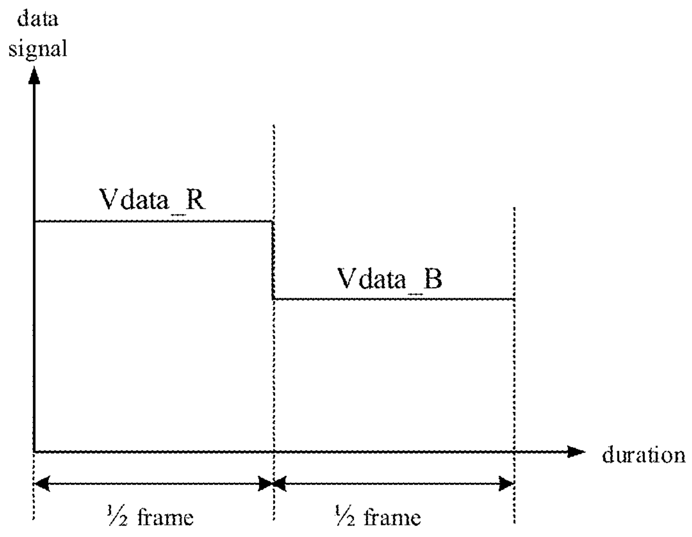
FIG. 4 shows a schematic diagram of a time sequence of data signals of a display panel according to an embodiment of the present application.

With reference to FIG. 1, FIG. 3 and FIG. 4, in a time sequence of the data signals of FIG. 4, the first column of the sub-pixels in FIG. 1 are given as an example, in the first ½ frame of one frame, the data signal is a data signal Vdata R corresponding to the first sub-pixels R, and in the second ½ frame of one frame, the data signal is a data signal Vdata_B corresponding to the second sub-pixels B. As such, the data signals may only be required to be inverted once in a duration of one image frame. Herein, inverting the data signals once may mean the data signals change from one voltage value to the other voltage value.

In some embodiments, as shown in FIG. 1, the display panel 100 includes a first edge 101 and a second edge 102 opposite to each other along a column direction Y. The first edge 101 and the second edge 102 extend along a row direction Y. The first edge 101 may be an edge away from the data driver 30, and the second edge 102 may be an edge close to the data driver 30.

The first shift register unit 211 of the first level to the first shift register units 211 of the last level may be arranged in one column, and the first shift register unit 211 of the first level to the first shift register units 211 of the last level may be arranged away from the first edge 101 in sequence.

The second shift register unit 221 of the first level to the second shift register unit 221 of the last level may be arranged in one column, and the second shift register unit 221 of the first level to the second shift register unit 221 of the last level may be arranged away from the first edge 101 in sequence.

The display panel may further include gate lines 40. The first shift register units 211 and the second shift register units 221 are electrically connected to different rows of the sub-pixels via the gate lines 40.

Along the column direction, an arrangement order of the plurality of rows of the sub-pixels electrically connected to the plurality of first shift register units 211 is identical to an arrangement order of the first shift register units 211, and an arrangement order of the plurality of rows of the sub-pixels electrically connected to the plurality of second shift register units 221 is identical to an arrangement order of the second shift register units 221. As such, each of the first shift register units 211 may be electrically connected to the sub-pixel row corresponding to each of the first shift register units 211 in close proximity, and each of the second shift register units 221 may further be electrically connected to the sub-pixel row corresponding to each of the second shift register units 221 in close proximity, so that a distance between the shift register unit and the sub-pixel row corresponding the shift register unit may be avoided, and thus a length of a connection line between the two may be shortened, which is beneficial for reducing signal delay and achieving a narrow frame.

As an example, the gate lines 40 may include first gate lines 41 and second gate lines 42. In an example, the first shift register units 211 may be electrically connected to the odd rows of the sub-pixels via the first gate lines 41, and the second shift register units 221 may be electrically connected to the even rows of the sub-pixels via the second gate lines 42.

Each of the first gate lines 41 may include a first gate line 41*s* transmitting the scanning signal and a first gate line 41*e* transmitting the light emitting control signal. Each of the second gate lines 42 may include a second gate line 42*s* transmitting the scanning signal and a second gate line 42*e* transmitting the light emitting control signal.

The first shift register units 211*s* are electrically connected to the odd rows of the sub-pixels via the first gate lines 41*s*, and the second shift register units 221*s* are electrically connected to the even rows of the sub-pixels via the second gate lines 42*s*. The first shift register units 211*e* are electrically connected to the odd rows of the sub-pixels via the first gate lines 41*e*, and the second shift register units 221*e* are electrically connected to the even rows of the sub-pixels via the second gate lines 42*e*.

As an example, along the column direction Y, along the column direction, the first gate driver 21 provides, according to a first order, the first gate driving signal for each row of the sub-pixels electrically connected to the first gate driver 21, and the second gate driver 22 also provides, also according to the first order, the second gate driving signal for each row of the sub-pixels electrically connected to the second gate driver 22. In other words, a scanning order of the first gate driver 21 may be the same as a scanning order of the second gate driver 22.

Specifically, along the column direction Y, the first gate driver 21 may provide, according to the first order, an ON-level of the scanning signal for each row of the sub-pixels electrically connected to the first gate driver 21, and the first gate driver 21 may provide, according to the first order, an OFF-level of the light emitting control signal for each row of the sub-pixels electrically connected to the first gate driver 21.

Along the column direction Y, the second gate driver 22 provides, also according to the first order, the ON-level of the scanning signal for each row of the sub-pixels electrically connected to the second gate driver 22, and the second gate driver 22 provides, according to the first order, the OFF-level of the light emitting control signal for each row of the sub-pixels electrically connected to the second gate driver 22.

In a case where the scanning order of the first gate driver 21 is the same as the scanning order of the second gate driver 22, a certain time interval during which each two adjacent rows of the sub-pixels are scanned and refreshed may be ensured, which is beneficial for mitigating a flicker phenomenon of the display panel.

With reference to FIG. 2, for the same row of the sub-pixels, in a case where the light emitting control signal EM received by the same row of the sub-pixels is at the OFF-level, and the scanning signal Scan (n) received by the same row of the sub-pixels is at the ON-level, the data signal Vdata may be written into the gate of the driving transistor T1. In the accompanying drawings of the present application, an example is given in which the ON-level of the scanning signal is a low level, and the OFF-level of the light emitting control signal is a high level, which is not intended to limit the present application.

In an example, along the column direction Y, an order in which each row of the sub-pixels is scanned along a direction gradually closer to the data driver is called a forward scanning order, and an order in which each row of the sub-pixels is scanned along a direction gradually away from the data driver is called a reverse scanning order.

Herein, the first order may be either the forward scanning order or the reverse scanning order.

In an example, the scanning order of the first gate driver 21 and the second gate driver 22 is the first order, and the first order is the forward scanning order. The first gate driver 21 may scan, according to the forward scanning order, the odd rows of the sub-pixels in sequence, and then the second gate driver 22 may scan, according to the forward scanning order, the even rows of the sub-pixels in sequence.

Specifically, as shown in FIG. 3, the first shift register unit 211*s* of the first level to the first shift register unit 211*s* of the last level in the first gate driver 21 output, in sequence, the ON-level of the scanning signal which is provided to the odd rows of the sub-pixels according to the forward scanning order, and the first shift register unit 211*e* of the first level to the first shift register unit 211*e* of the last level in the first gate driver 21 output, in sequence, the OFF-level of the light emitting control signal which is provided to the odd rows of the sub-pixels according to the forward scanning order.

Then, the second shift register unit 221*s* of the first level to the second shift register unit 221*s* of the last level in the second gate driver 22 output, in sequence, the ON-level of the scanning signal which is provided to the even rows of the sub-pixels according to the forward scanning order, and the second shift register unit 221*e* of the first level to the second shift register unit 221*e* of the last level in the second gate driver 22 output, in sequence, the OFF-level of the light emitting control signal which is provided to the even rows of the sub-pixels according to the forward scanning order.

In a case where the scanning order of the first gate driver 21 and the second gate driver 22 is the first order, and the first order is the forward scanning order, the shift register units may be in a cascaded connection as shown in FIG. 1. A trigger signal input terminal of the first shift register unit 211 of the first level is electrically connected to a trigger signal terminal 50 of the display panel, and an output signal terminal of the first shift register unit 211 of an $i^{th}$ level is electrically connected to a trigger signal input terminal of the first shift register unit of an $(i+1)^{th}$ level, a trigger signal input terminal of the second shift register unit 221 of the first level is electrically connected to an output signal terminal of the first shift register unit 211 of the last level, and an output signal terminal of the second shift register unit 221 of a $(j+1)^{th}$ level is electrically connected to a trigger signal input terminal of the second shift register unit 221 of a $j^{th}$ level. i≥1, and i is an integer.

The trigger signal terminal 50 may include a scanning trigger signal terminal 50*s* and a light emitting trigger signal terminal 50*e*. A trigger signal input terminal of the first shift register unit 211*s* of the first level is electrically connected to the scanning trigger signal terminal 50*s*, and a trigger signal input terminal of the first shift register unit 211*e* of the first level is electrically connected to the light emitting trigger signal terminal 50*e*. A location of the trigger signal terminal 50 in the accompanying drawings of the present application is merely illustrative and is not intended to limit the present application.

In an example, the scanning order of the first gate driver 21 and the second gate driver 22 is the first order, and the first order is the reverse scanning order. The first gate driver 21 may scan, according to the reverse scanning order, the odd rows of the sub-pixels in sequence, and then the second gate driver 22 may scan, according to the reverse scanning order, the even rows of the sub-pixels in sequence.

Figure 5:
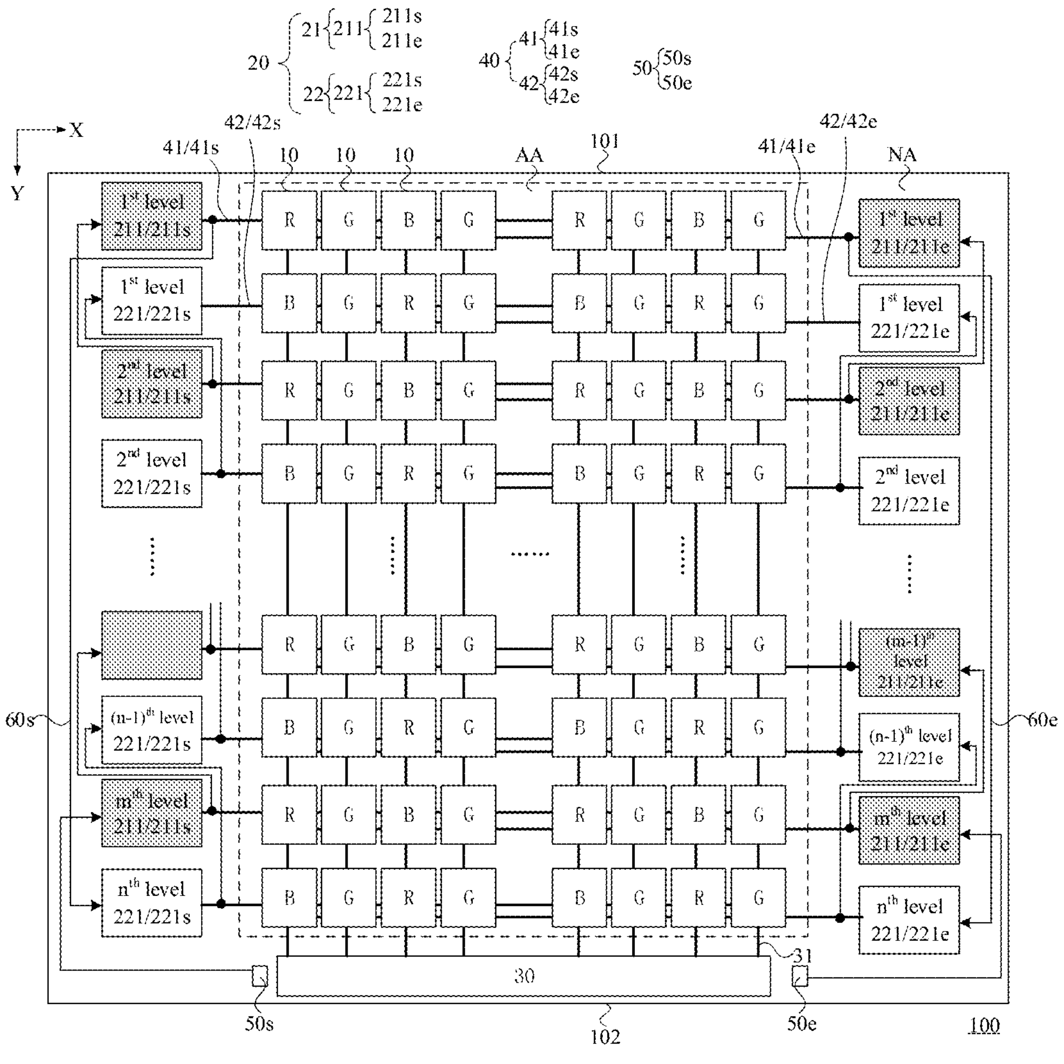
FIG. 5 shows a schematic structural diagram of a display panel according to another embodiment of the present application.
Figure 6:
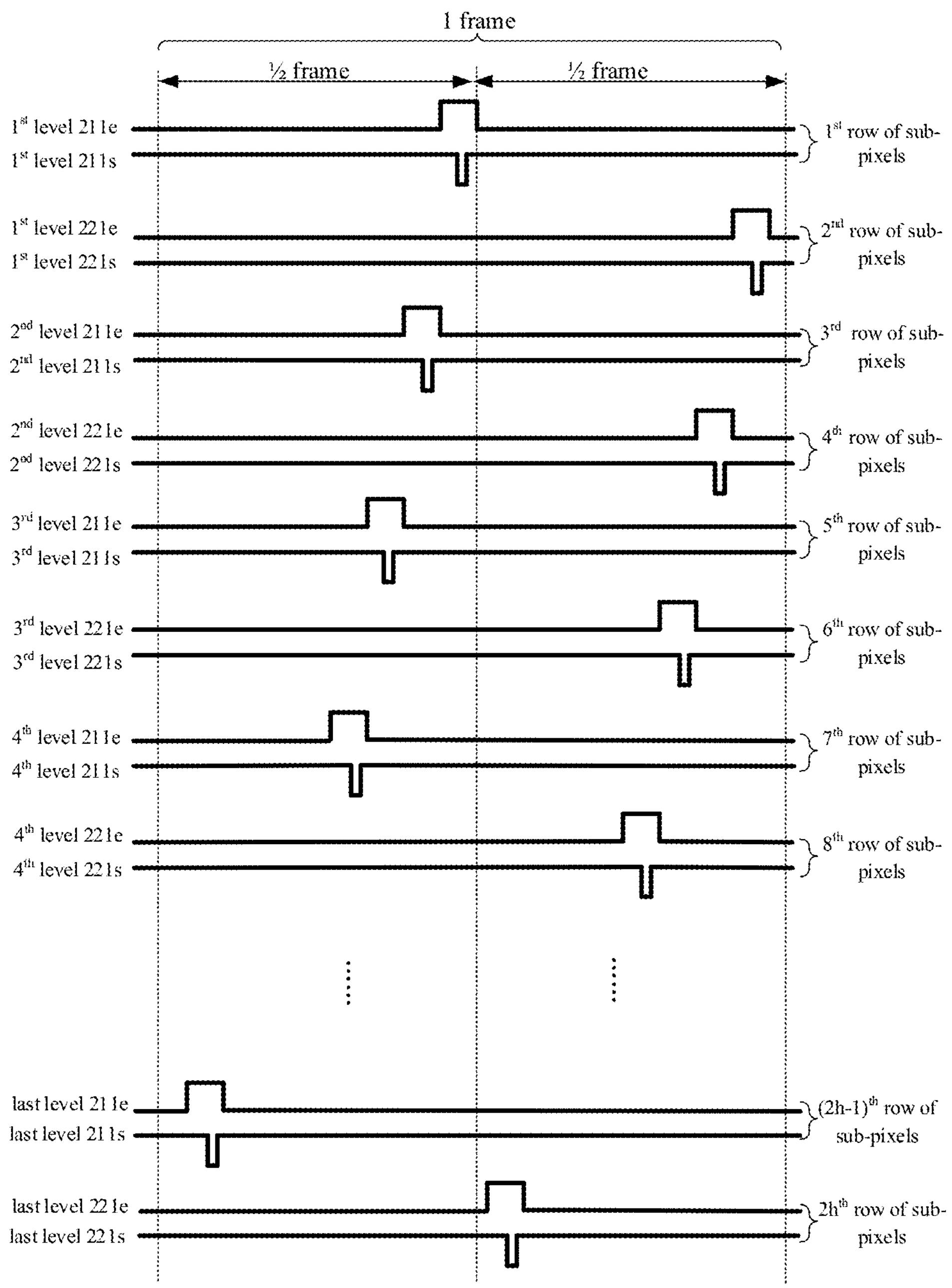
FIG. 6 shows a schematic diagram of a time sequence of output signals of gate drivers of a display panel according to another embodiment of the present application.

Specifically, with reference to FIG. 5 and FIG. 6, the first shift register unit 211*s* of the last level to the first shift register unit 211*s* of the first level in the first gate driver 21 output, in sequence, the ON-level of the scanning signal which is provided to the odd rows of the sub-pixels according to the reverse scanning order, and the first shift register unit 211*e* of the last level to the first shift register unit 211*e* of the first level in the first gate driver 21 output, in sequence, the OFF-level of the light emitting control signal which is provided to the rows of the sub-pixels according to the reverse scanning order.

Then, the second shift register unit 221*s* of the last level to the second shift register unit 221*s* of the first level in the second gate driver 22 output, in sequence, the ON-level of the scanning signal which is provided to the even rows of the sub-pixels according to the reverse scanning order, and the second shift register unit 221*e* of the last level to the second shift register unit 221*e* of the last level in the second gate driver 22 output, in sequence, the OFF-level of the light emitting control signal which is provided to the even rows of the sub-pixels according to the reverse scanning order.

In a case where the scanning order of the first gate driver 21 and the second gate driver 22 is the first order, and the first order is the reverse scanning order, the shift register units may be in a cascaded connection as shown in FIG. 5.

With reference to FIG. 5, a trigger signal input terminal of the first shift register unit 211 of the last level is electrically connected to the trigger signal terminal 50 of the display panel, and an output signal terminal of the first shift register unit 211 of the $(i+1)^{th}$ level is electrically connected to an trigger signal input terminal of the first shift register unit 211 of the $i^{th}$ level, a trigger signal input terminal of the second shift register unit 221 of the last level is electrically connected to an output signal terminal of the first shift register unit 211 of the first level, and an output signal terminal of the second shift register unit 221 of the $(j+1)^{th}$ level is electrically connected to a trigger signal input terminal of the second shift register unit 221 of the $j^{th}$ level. j≥1, and j is an integer.

In an example, a trigger signal input terminal of the first shift register unit 211*s* of the last level is electrically connected to the scanning trigger signal terminal 50*s*, and a trigger signal input terminal of the first shift register unit 211*e* of the last level is electrically connected to the scanning trigger signal terminal 50*e*.

As another example, along the column direction Y, the first gate driver 21 provides, according to the first order, the first gate driving signal for each row of the sub-pixels electrically connected to the first gate driver 21, and the second gate driver 22 provides, according to a second order, the second gate driving signal for each row of the sub-pixels electrically connected to the second gate driver 22. In other words, scanning orders of the first gate driver 21 and the second gate driver 22 may be different.

Specifically, along the column direction Y, the first gate driver 21 may provide, according to the first order, the ON-level of the scanning signal for each row of the sub-pixels electrically connected to the first gate driver 21, and the first gate driver 21 provides, according to the first order, the OFF-level of the light emitting control signal for each row of the sub-pixels electrically connected to the first gate driver 21.

The second gate driver 22 may provide, according to the second order, the ON-level of the scanning signal for each row of the sub-pixels electrically connected to the second gate driver 22, and the second gate driver 22 provides, according to the second order, the OFF-level of the light emitting control signal for each row of the sub-pixels electrically connected to the second gate driver 22.

In a case where the scanning orders of the first gate driver 21 and the second gate driver 22 are different, a cascaded connection line between the first gate driver 21 and the second gate driver 22 may be shortened, which may reduce the signal delay.

In an example, the first order may be the forward scanning order, and a second scanning order may be the reverse scanning order; or the first order may be the reverse scanning order, and the second scanning order may be the forward scanning order.

In an example in which the first order is the forward scanning order, and the second scanning order is the reverse scanning order, the first gate driver 21 may scan, according to the forward scanning order, the odd rows of the sub-pixels in sequence, and then the second gate driver 22 may scan, according to the reverse scanning order, the even rows of the sub-pixels in sequence.

Figure 7:
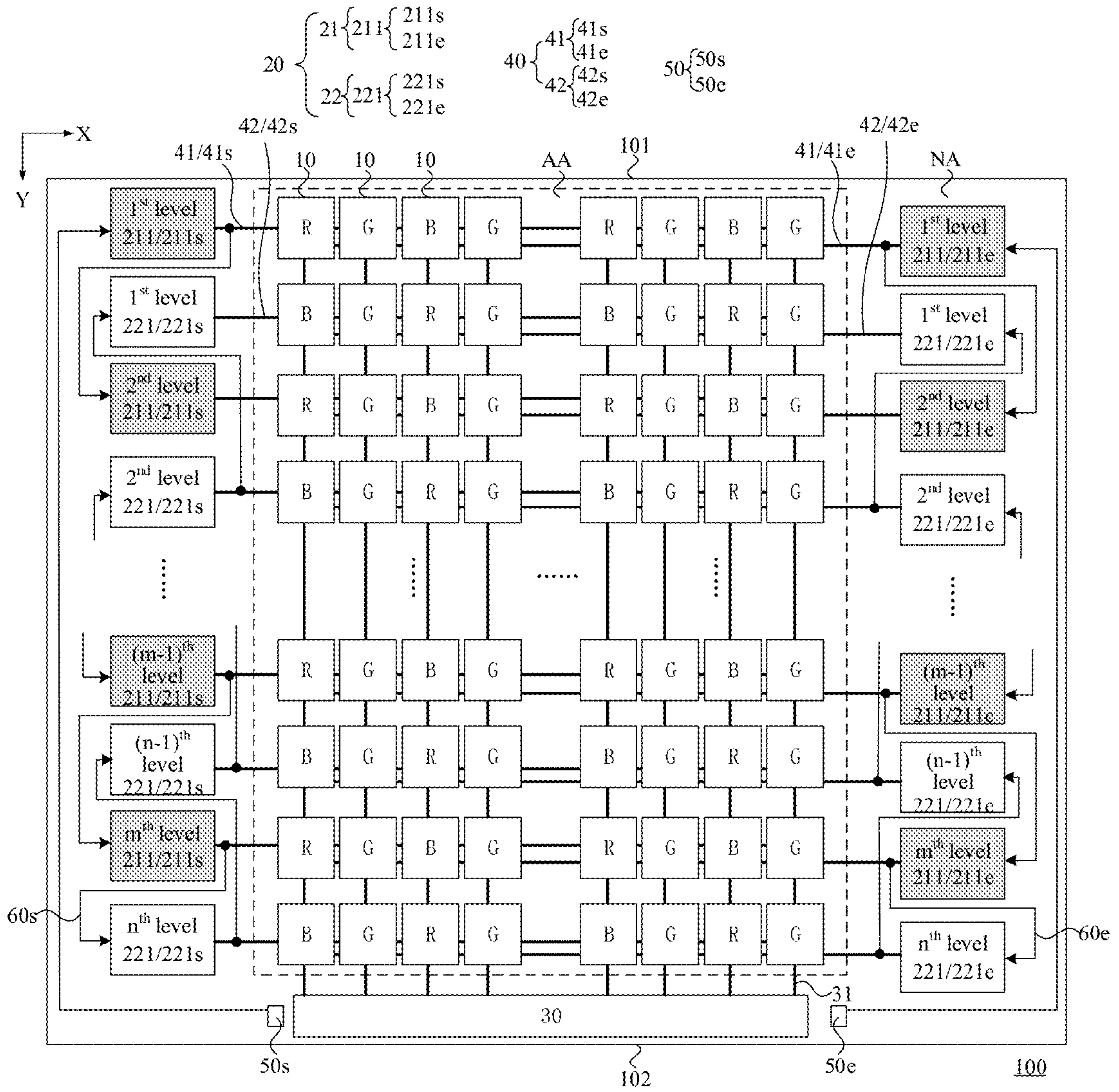
FIG. 7 shows a schematic structural diagram of a display panel according to yet another embodiment of the present application.
Figure 8:
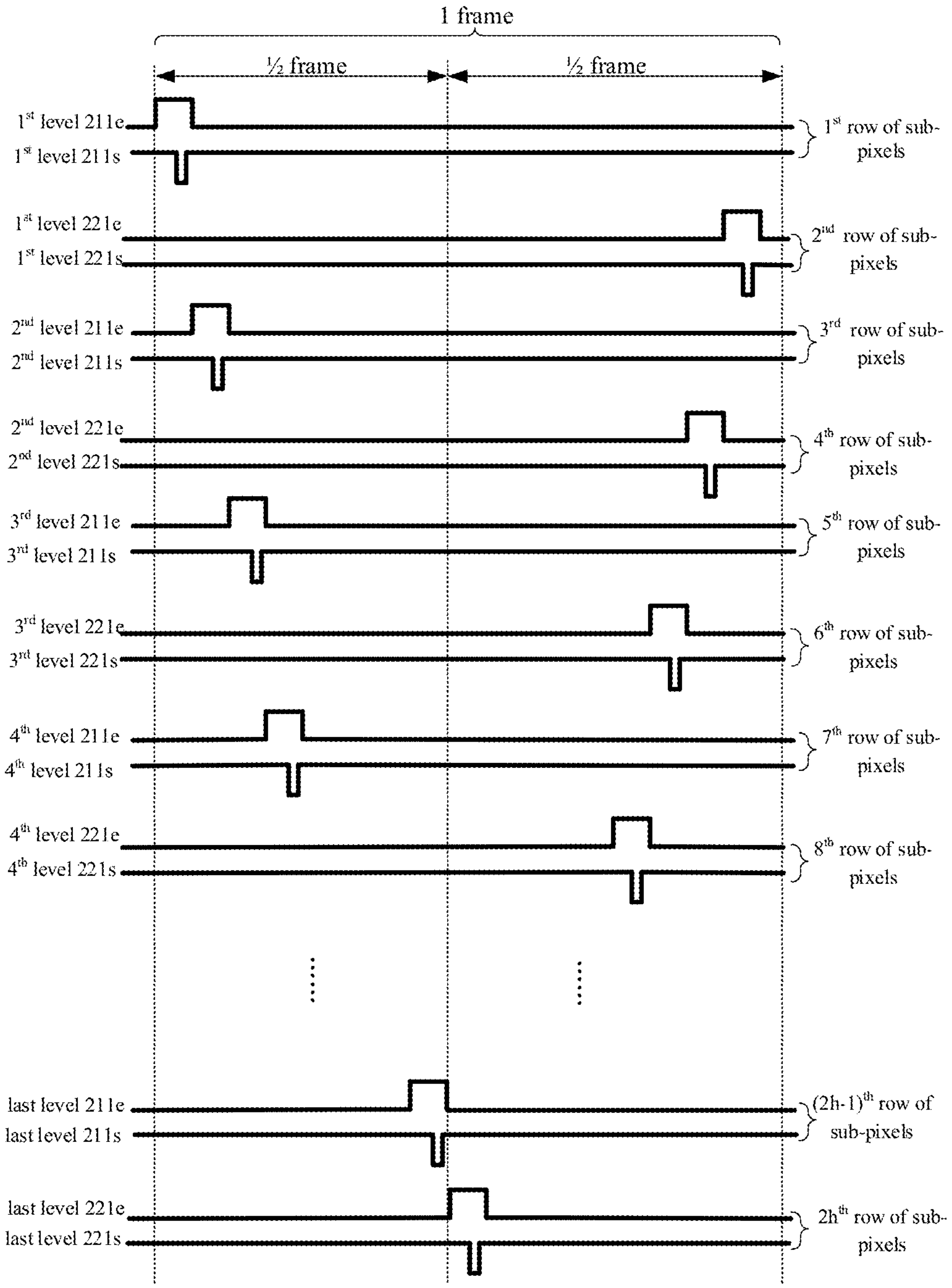
FIG. 8 shows a schematic diagram of a time sequence of output signals of gate drivers of a display panel according to yet another embodiment of the present application.

Specifically, with reference to FIG. 7 and FIG. 8, the first shift register unit 211*s* of the first level to the first shift register unit 211*s* of the last level in the first gate driver 21 output, in sequence, the ON-level of the scanning signal which is provided to the odd rows of the sub-pixels according to the forward scanning order, and the first shift register unit 211*e* of the first level to the first shift register unit 211*e* of the last level in the first gate driver 21 output, in sequence, the OFF-level of the light emitting control signal which is provided to the odd rows of the sub-pixels according to the forward scanning order.

Then, the second shift register unit 221*s* of the last level to the second shift register unit 221*s* of the first level in the second gate driver 22 output, in sequence, the ON-level of the scanning signal which is provided to the even rows of the sub-pixels according to the reverse scanning order, and the second shift register unit 221*e* of the last level to the second shift register unit 221*e* of the last level in the second gate driver 22 output, in sequence, the OFF-level of the light emitting control signal which is provided to the even rows of the sub-pixels according to the reverse scanning order.

In a case where the scanning order of the first gate driver 21 is the forward scanning order, and the scanning order of the second gate driver 22 is the reverse scanning order, the shift register units may be in a cascaded connection as shown in FIG. 7.

With reference to FIG. 7, the trigger signal input terminal of the first shift register unit 211 of the first level is electrically connected to the trigger signal terminal 50 of the display panel, and the output signal terminal of the first shift register unit 211 of the level is electrically connected to the trigger signal input terminal of the first shift register unit 211 of the $(i+1)^{th}$ level, the trigger signal input terminal of the second shift register unit 221 of the last level is electrically connected to the output signal terminal of the first shift register unit 211 of the last level, and the output signal terminal of the second shift register unit 221 of the $(j+1)^{th}$ level is electrically connected to the trigger signal input terminal of the second shift register unit 221 of the $j^{th}$ level. $i \geq 1$, and i is an integer.

In an example, a trigger signal input terminal of the first shift register unit 211*s* of the first level is electrically connected to the scanning trigger signal terminal 50*s*, and a trigger signal input terminal of the first shift register unit 211*e* of the first level is electrically connected to the scanning trigger signal terminal 50*e*.

In an example, the trigger signal input terminal of the second shift register unit 221 of the last level is electrically connected to the output signal terminal of the first shift register unit 211 of the last level via a cascaded connection line 60. For example, a trigger signal input terminal of the second shift register unit 221*s* of the last level is electrically connected to an output signal terminal of the first shift register unit 211*s* of the last level via a cascaded connection line 60*s*, and since the second shift register unit 221*s* of the last level is relatively close to the first shift register unit 211*s* of the last level, a length of the cascaded line 60*s* may be relatively short. A trigger signal input terminal of the second shift register unit 221*e* of the last level is electrically connected to an output signal terminal of the first shift register unit 211*e* of the last level via a cascaded connection line 60*e*, and similarly, since the second shift register unit 221*e* of the last level is relatively close to the first shift register unit 211*e* of the last level, a length of the cascaded line 60*e* may be relatively short.

In an example in which the first order is the reverse scanning order, and the second scanning order is the forward scanning order, the first gate driver 21 may scan, according to the reverse scanning order, the odd rows of the sub-pixels in sequence, and then the second gate driver 22 may scan, according to the forward scanning order, the even rows of the sub-pixels in sequence.

Figure 9:
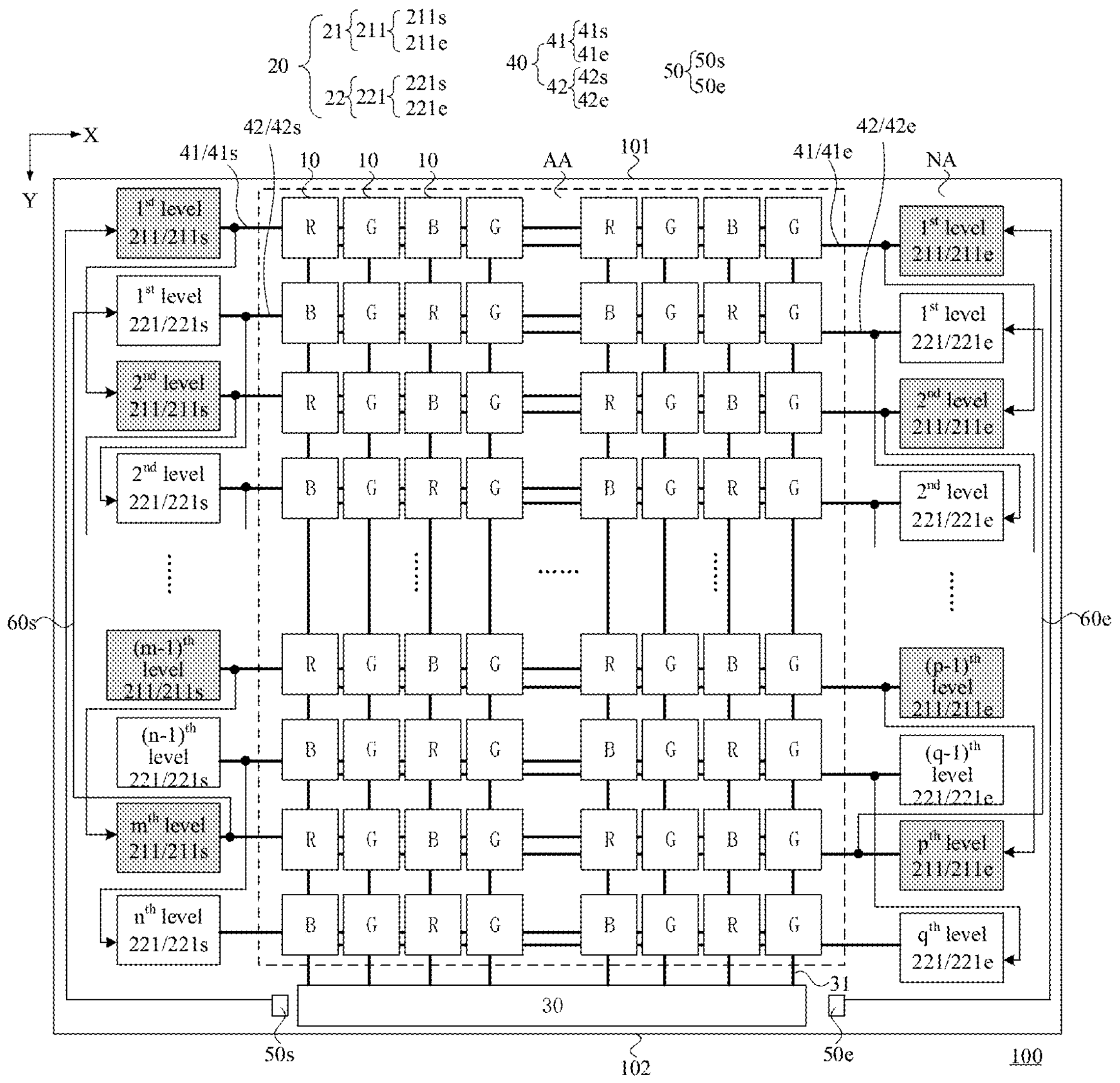
FIG. 9 shows a schematic structural diagram of a display panel according to yet another embodiment of the present application.
Figure 10:
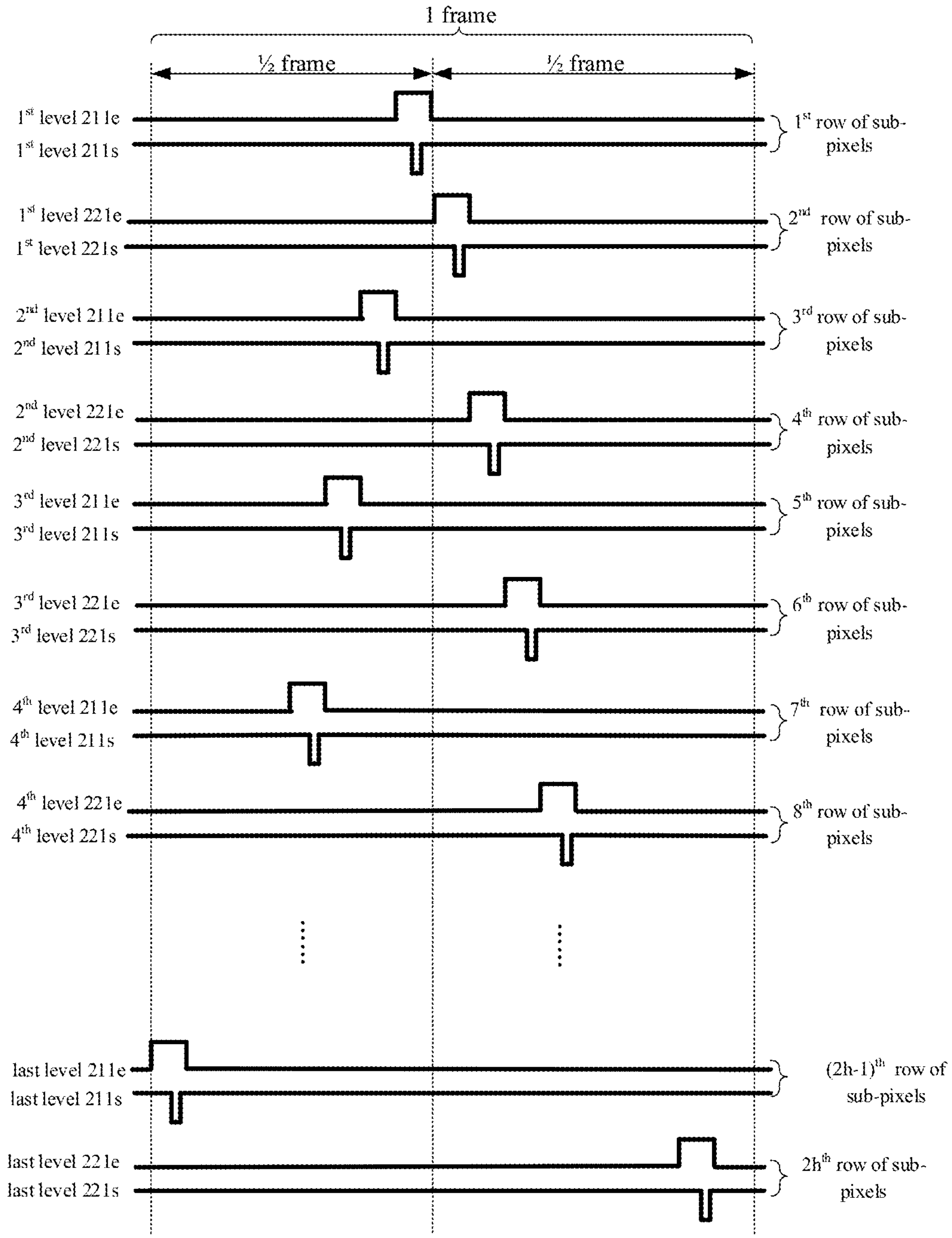
FIG. 10 shows a schematic diagram of a time sequence of output signals of gate drivers of a display panel according to yet another embodiment of the present application.

Specifically, with reference to FIG. 9 and FIG. 10, the first shift register unit 211*s* of the last level to the first shift register unit 211*s* of the first level in the first gate driver 21 output, in sequence, the ON-level of the scanning signal which is provided to the odd rows of the sub-pixels according to the reverse scanning order, and the first shift register unit 211*e* of the last level to the first shift register unit 211*e* of the first level in the first gate driver 21 output, in sequence, the OFF-level of the light emitting control signal which is provided to the rows of the sub-pixels according to the reverse scanning order.

Then, the second shift register unit 221*s* of the first level to the second shift register unit 221*s* of the last level in the second gate driver 22 output, in sequence, the ON-level of the scanning signal which is provided to the even rows of the sub-pixels according to the forward scanning order, and the second shift register unit 221*e* of the first level to the second shift register unit 221*e* of the last level in the second gate driver 22 output, in sequence, the OFF-level of the light emitting control signal which is provided to the even rows of the sub-pixels according to the forward scanning order.

In a case where the scanning order of the first gate driver 21 is the reverse scanning order, and the scanning order of the second gate driver 22 is the forward scanning order, the shift register units may be in a cascaded connection as shown in FIG. 9.

With reference to FIG. 9, the trigger signal input terminal of the first shift register unit 211 of the last level is electrically connected to the trigger signal terminal 50 of the display panel, and the output signal terminal of the first shift register unit 211 of the $(i+1)^{th}$ level is electrically connected to the trigger signal input terminal of the first shift register unit 211 of the level, a trigger signal input terminal of the second shift register unit 221 of the first level is electrically connected to the output signal terminal of the first shift register unit 211 of the first level, and the output signal terminal of the second shift register unit 221 of the $j^{th}$ level is electrically connected to the trigger signal input terminal of the second shift register unit 221 of the $(j+1)^{th}$ level, $j \geq 1$, and j is an integer.

In an example, a trigger signal input terminal of the first shift register unit 211*s* of the last level is electrically connected to the scanning trigger signal terminal 50*s*, and a trigger signal input terminal of the first shift register unit 211*e* of the last level is electrically connected to the scanning trigger signal terminal 50*e*.

In an example, the trigger signal input terminal of the second shift register unit 221 of the first level is electrically connected to the output signal terminal of the first shift register unit 211 of the first level via the cascaded line 60. For example, a trigger signal input terminal of the second shift register unit 221*s* of the first level may be electrically connected to an output signal terminal of the first shift register unit 211*s* of the first level via the cascaded connection line 60*s*, and since the second shift register unit 221*s* of the first level is relatively close to the first shift register unit 211*s* of the first level, the length of the cascaded line 60*s* may be relatively short. A trigger signal input terminal of the second shift register unit 221*e* of the first level may be electrically connected to an output signal terminal of the first shift register unit 211*e* of the first level via the cascaded connection line 60*e*, and similarly, since the second shift register unit 221*e* of the first level is relatively close to the first shift register unit 211*e* of the first level, the length of the cascaded line 60*e* may be relatively short.

In some embodiments, as shown in FIG. 1, the sub-pixels 10 of the display panel include the first sub-pixels R, the second sub-pixels B and the third sub-pixels G emitting different colors of light. In two adjacent rows of the sub-pixels, one row of the sub-pixels is arranged in an order of the first sub-pixel R, the third sub-pixel G, the second sub-pixel B and the third sub-pixel G, and the other row of the sub-pixels is arranged in an order of the second sub-pixel B, the third sub-pixel G, the first sub-pixel R and the third sub-pixel G. As such, each row of the sub-pixels includes the first sub-pixel R, the second sub-pixel B and the third sub-pixel G, so that a distribution of each color of the sub-pixels is relatively uniform, which is beneficial for improving display effects.

In some embodiments, with reference to any one of FIG. 1, FIG. 5, FIG. 7 and FIG. 9, along the column direction Y, the first shift register units 211 and the second shift register units 221 are alternately distributed on a same side of the display panel, it can be understood that, the first shift register units 211 are electrically connected to rows of sub-pixels controlled by the first shift register units 211, and the second shift register units 221 are electrically connected to rows of sub-pixels controlled by the second shift register units 221.

For example, the first shift register units 211*s* and the second shift register units 221*s* are alternately distributed on a left side of the display panel, and the first shift register units 211*e* and the second shift register units 221*e* are alternately distributed on a right side of the display panel.

The first shift register units 211*s* are electrically connected to the odd rows of the sub-pixels, the second shift register units 221*s* are electrically connected to the even rows of the sub-pixels, and in a case where the first shift register units 211*s* and the second shift register units 221*s* are alternately distributed, each of the first shift register units 211*s* may be electrically connected to a corresponding odd row of the sub-pixels in close proximity, and each of the second shift register units 221*s* may also be electrically connected to a corresponding even row of the sub-pixels in close proximity, so that a distance between the shift register unit 211*s* and a corresponding row of the sub-pixels and a distance between the shift register unit 221*s* and a corresponding row of the sub-pixels may be avoided, and thus a length of a connection line between the shift register unit and a corresponding row of the sub-pixels may be shortened, which is beneficial for reducing the signal delay and achieving the narrow frame.

Similarly, the first shift register units 211*e* are electrically connected to the odd rows of the sub-pixels, the second shift register units 221*e* are electrically connected to the even rows of the sub-pixels, and in a case where the first shift register units 211*e* and the second shift register units 221*e* are alternately distributed, each of the first shift register units 211*e* may be electrically connected to a corresponding odd row of the sub-pixels in close proximity, and each of the second shift register units 221*e* may also be electrically connected to a corresponding even row of the sub-pixels in close proximity, so that a distance between the shift register unit 211*e* and a corresponding row of the sub-pixels and a distance between the shift register unit 221*e* and a corresponding row of the sub-pixels may be avoided, and thus a length of a connection line between the shift register unit and a corresponding row of the sub-pixels may be shortened, which is beneficial for reducing the signal delay and achieving the narrow frame.

Figure 11:
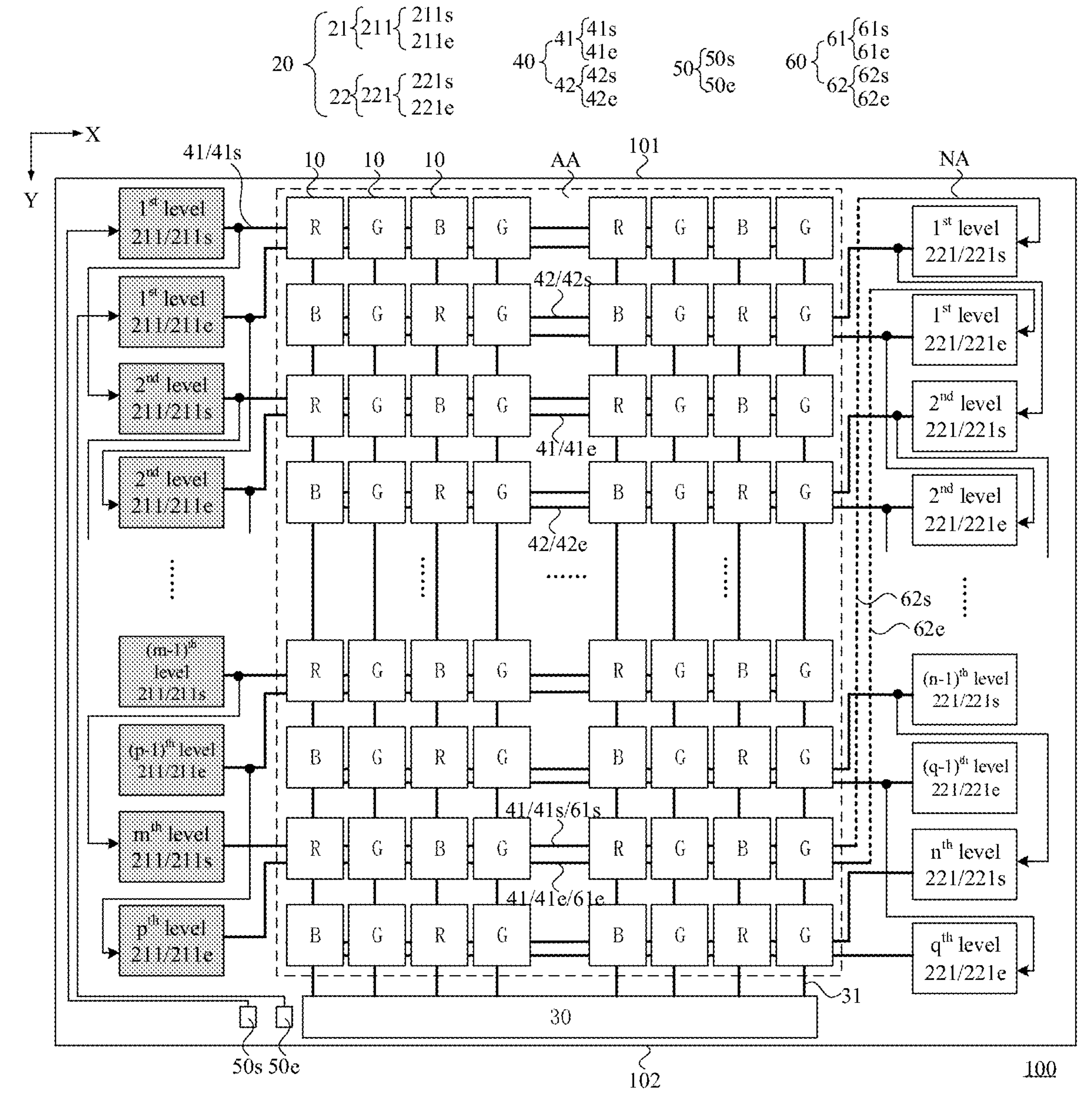
FIG. 11 shows a schematic structural diagram of a display panel according to yet another embodiment of the present application.
Figure 12:
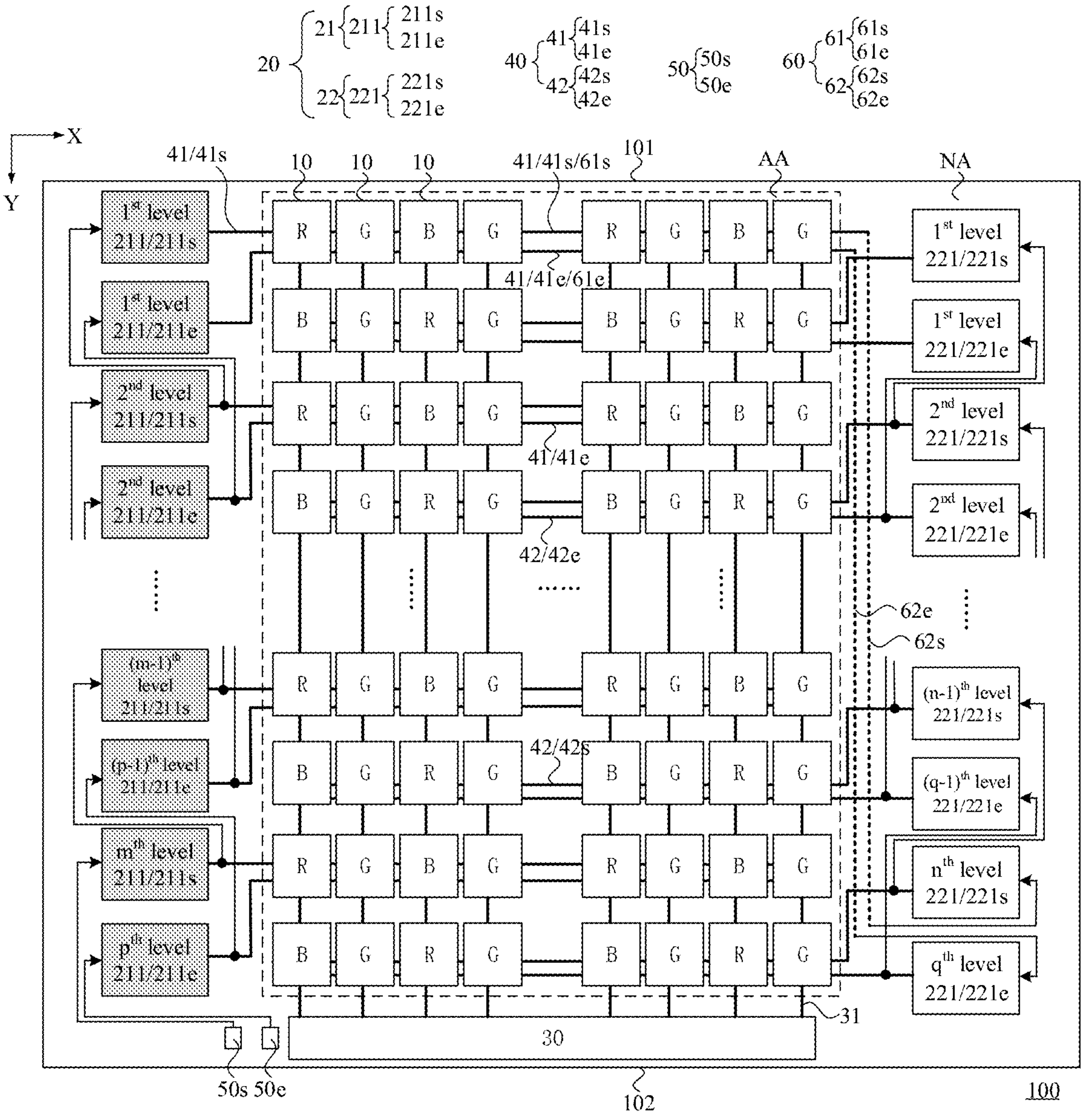
FIG. 12 shows a schematic structural diagram of a display panel according to yet another embodiment of the present application.

In some embodiments, with reference to FIG. 11 or FIG. 12, along a row direction X, the first shift register units 211 and the second shift register units 221 are distributed in a non-display region AA on both sides of the display panel. For example, the first shift register units 211*s* and the first shift register units 211*e* are located in a left non-display region, and the first shift register units 211*s* and the first shift register units 211*e* may be alternately distributed along the column direction. The second shift register units 221*s* and the second shift register units 221*e* are located in a right non-display region, and the second shift register units 221*s* and the second shift register units 221*e* may be alternately distributed along the column direction.

In an example, as shown in FIG. 11 or FIG. 12, an output signal terminal of the first shift register unit 211 of an $s^{th}$ level is electrically connected to the sub-pixels via a $k^{th}$ gate line 40. A trigger signal input terminal of the second shift register unit 221 of a e h level is electrically connected to the output signal terminal of the first shift register unit 221 of the st h level via the cascaded connection line 60, and the cascaded connection line 60 may include a first segment 61 and a second segment 62, extension directions of the first segment 61 and the second segment 62 intersect. The $k^{th}$ gate line 40 may be reused as the first segment 61, and the second segment 62 may be arranged in a non-display region NA of the display panel. The first shift register unit of the $s^{th}$ level is the first shift register unit of the first level, and the second shift register unit of the $t^{th}$ level is the second shift register unit of the last level; or the first shift register unit of the $s^{th}$ level is the first shift register unit of the last level, and the second shift register unit of the $t^{th}$ level is the second shift register unit of the first level. The $k^{th}$ gate line 40 is reused as the first segment 61, so that an additional first segment 61 is not required to be added, which may reduce a number of the lines of the display panel.

For example, as shown in FIG. 11, the first segment 61 may include a first segment 61*s* and a first segment 61*e*, and the second segment 62 may include a second segment 62*s* and a second segment 62*e*. The first segment 61*s* and the second segment 62*s* are connected between the first shift register unit 211*s* and the second shift register unit 221*s*. The first segment 61*e* and the second segment 62*e* are connected between the first shift register unit 211*e* and the second shift register unit 221*e*. In FIG. 11 and FIG. 12, the second segment 62*s* and the second segment 62*e* are illustratively shown in dashed lines for clarity in distinguishing between different lines.

Figure 13:
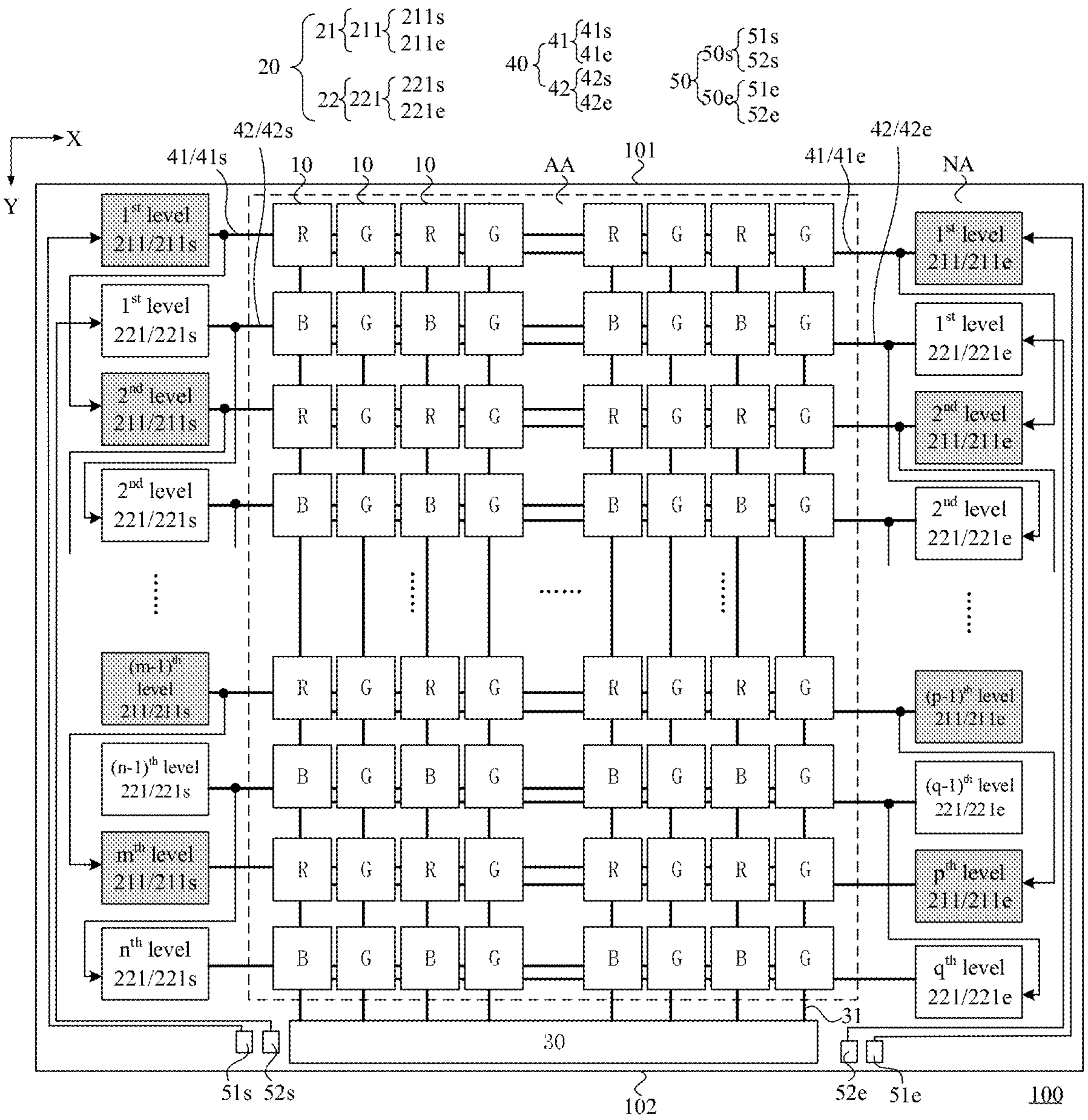
FIG. 13 shows a schematic structural diagram of a display panel according to yet another embodiment of the present application.

In some embodiments, the sub-pixels may further be arranged as shown in FIG. 13. Specifically, the sub-pixels 10 of the display panel may include first sub-pixels R, second sub-pixels B, and third sub-pixels G emitting different colors of light. At least a part of pixel columns may include both the first sub-pixels R and the second sub-pixels B, and the first sub-pixels R and the second sub-pixels B are located in different rows. The first sub-pixels R may be located in odd rows, and the second sub-pixels B may be located in even rows. In addition, the third sub-pixels G may be distributed in the odd rows and the even rows. For example, in the odd row, the first sub-pixel R and the third sub-pixel G are alternately distributed, and in the even row, the second sub-pixel B and the third sub-pixel G are alternately distributed.

Figure 14:
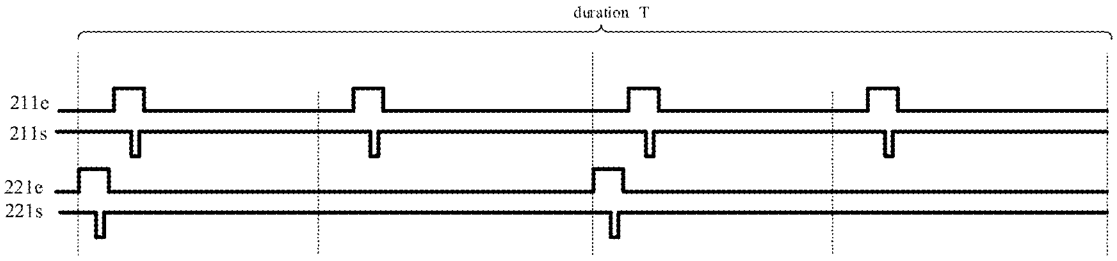
FIG. 14 shows a schematic diagram of a time sequence of output signals of gate drivers of a display panel according to yet another embodiment of the present application.

The first sub-pixel R may be electrically connected to a first shift register unit 211, the second sub-pixel B may be electrically connected to a second shift register unit 221, the first shift register unit 211 outputs a first gate driving signal, and the second shift register unit 221 outputs a second gate driving signal. As shown in FIG. 14, the first gate driving signal and the second gate driving signal may be different.

The sub-pixels emitting different colors of light may have different light-emitting characteristics, the gate driving signals corresponding to the sub-pixels emitting different colors of light are set to be different, and thus an appropriate gate driving signal for the sub-pixels may be set flexibly according to the light-emitting characteristics of the sub-pixels, which is beneficial for improving light-emitting effects.

In an example, the first gate driving signal includes a first scanning signal and a first light emitting control signal, and the second gate driving signal includes a second scanning signal and a second light emitting control signal. As shown in FIG. 13, the first shift register unit 211*s* may output the first scanning signal, the second shift register unit 221*s* may output the second scanning signal, and the first scanning signal and the second scanning signal may be different. The first shift register unit 211*e* may output the first light emitting control signal, the second shift register unit 221*e* may output the second light emitting control signal, and the first light emitting control signal and the second light emitting control signal may be different.

Figure 15:
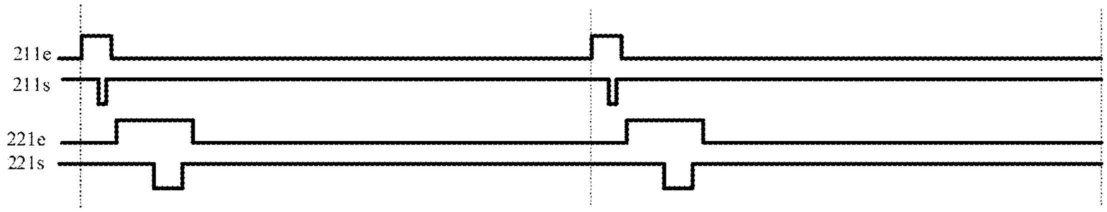
FIG. 15 shows a schematic diagram of a time sequence of output signals of gate drivers of a display panel according to yet another embodiment of the present application.

Specifically, as shown in FIG. 14, a refresh frequency of the first scanning signal may be different from a refresh frequency of the second scanning signal, and a refresh frequency of the first light emitting control signal may be different from a refresh frequency of the second light emitting control signal. And/or, as shown in FIG. 15, an ON-level duration of the first scanning signal is different from an ON-level duration of the second scanning signal, and an OFF-level duration of the first light emitting control signal is different from an OFF-level duration of the second light emitting control signal. In the accompanying drawings of the present application, the ON-level of the scanning signal is shown as the low level, and the OFF-level of the light emitting control signal is shown as the high level.

In an example, the refresh frequency of the scanning signal is calculated based on a minimum period during which the data signal is written into the driving transistor, and in one refresh period of the scanning signal, the scanning signal provides the ON-level once, and the data signal is written into the driving transistor once. In one refresh period of the light emitting control signal, the light emitting control signal provides the OFF-level once.

For example, as shown in FIG. 14, in a same duration T, a refresh frequency of the first scanning signal output by the first shift register unit 211*s* is different from a refresh frequency of the second scanning signal output by the second shift register unit 221*s*, and a refresh frequency of the first light emitting control signal output by the first shift register unit 211*e* is different from a refresh frequency of the second light emitting control signal output by the second shift register unit 221*e*.

The accompanying drawings show, in an example, that the refresh frequency of the first scanning signal output by the first shift register unit 211*s* may be the same as the refresh frequency of the first light emitting control signal output by the first shift register unit 211*e*, and the refresh frequency of the second scanning signal output by the second shift register unit 221*s* is the same as the refresh frequency of the second light emitting control signal output by the second shift register unit 221*e*. The refresh frequency of the first scanning signal output by the first shift register unit 211*s* may be different from the refresh frequency of the first light emitting control signal output by the first shift register unit 211*e*, and the refresh frequency of the second scanning signal output by the second shift register unit 221*s* may be different from the refresh frequency of the second light emitting control signal output by the second shift register unit 221*e*, which is not limited in the present application.

In some embodiments, for example, light-emitting efficiency of the first sub-pixels R is greater than light-emitting efficiency of the second sub-pixels B. As shown in FIG. 13, the first scanning signal output by the first shift register unit 211*s* and the first light emitting control signal output by the first shift register unit 211*e* are used for controlling the first sub-pixels R, and the second scanning signal output by the second shift register unit 221*s* and the second light emitting control signal output by the second shift register unit 221*e* are used for controlling the second sub-pixels B.

The refresh frequency of the first scanning signal may be greater than the refresh frequency of the second scanning signal, and the refresh frequency of the first light emitting control signal may be greater than the refresh frequency of the second light emitting control signal.

And/or, the ON-level duration of the first scanning signal is less than the ON-level duration of the second scanning signal, and the OFF-level duration of the first light emitting control signal is less than the OFF-level duration of the second light emitting control signal.

For sub-pixels with low light-emitting efficiency, a refresh frequency of a control signal is low, so that a scanning duration corresponding to the sub-pixels with the low light-emitting efficiency is long, and the data signal takes long to be charged, so that the data signal can be written into the driving transistor efficiently, which is beneficial for improving the light-emitting effects. Similarly, the longer the ON-level duration of the first scanning signal is, the longer the data signal takes to be charged, so that the data signal can be written into the driving transistor efficiently, which is beneficial for improving the light-emitting effects. In addition, for the sub-pixels with the low light-emitting efficiency, the refresh frequency of the control signal is low, so that power consumption of the shift register unit electrically connected to the sub-pixels with the low light-emitting efficiency is further reduced.

In an example, the first gate driver 21 and the second gate driver 22 may be electrically connected to different trigger signal terminals 50, respectively. And/or, the first gate driver 21 and the second gate driver 22 may be electrically connected to different clock signal terminals (not shown in FIG. 13), respectively.

For example, the first gate driver 21 is electrically connected to a trigger signal terminal 51*s* and a trigger signal terminal 51*e*. The second gate driver 22 is electrically connected to a trigger signal terminal 52*s* and a trigger signal terminal 52*e*. The trigger signal terminal 51*s* and the trigger signal terminal 52*s* output different scanning trigger signals, and the trigger signal terminal 51*e* and the trigger signal terminal 52*e* output different light emitting control trigger signals, so that the first gate driver 21 and the second gate driver 22 emit different gate control signals.

Of course, the above is merely an example, and the first gate driver 21 and the second gate driver 22 emit the different gate control signals by other manners, which is not limited in the present application.

Figure 16:
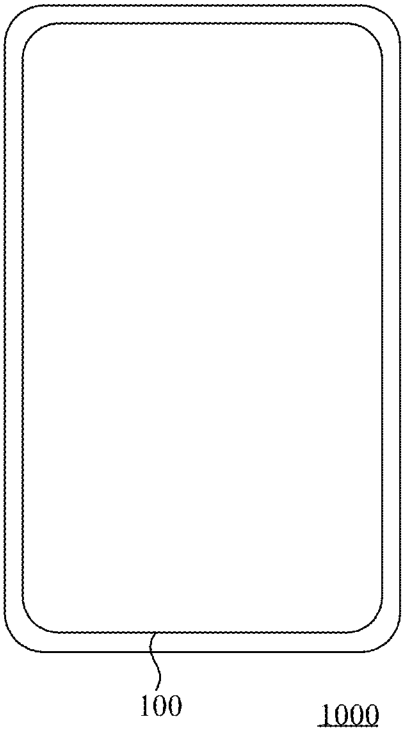
FIG. 16 shows a schematic structural diagram of a display apparatus according to yet another embodiment of the present application.

Based on the same inventive concept, the present application further provides a display apparatus including the display panel according the present application. With reference to FIG. 16, FIG. 16 is a schematic structural diagram of a display apparatus according to an embodiment of the present application. A display apparatus 1000 provided by FIG. 16 includes the display panel 100 according to any one of the embodiments of the present application described above. In the embodiment of FIG. 16, a mobile phone is only given as an example to illustrate the display apparatus 1000, and it can be understood that, the display apparatus according to the embodiments of the present application may be other display apparatus with a display function, such as, a wearable product, a computer, a television, and a vehicle-mounted display apparatus, which are not are not particularly limited by the embodiments of the present application. The display apparatus according to the embodiments of the present application has beneficial effects of the display panel provided by the embodiments of the present application. For details, please refer to the specific descriptions of the display panel in the above embodiments, which are not repeated in this embodiment.

According to the embodiments of present application as described above, these embodiments do not exhaustively describe all the details and do not limit the present application only to the specific embodiments. Obviously, many modifications and variations can be made according to the above description. These embodiments are selected and specifically described in the specification to better explain the principles and practical applications of the present application, so that a person skilled in the art is able to utilize the present application and make modifications based on the present application. The present application is limited only by the claims and the full scope and equivalents thereof

What is claimed is:

1. A display panel, comprising:

a plurality of sub-pixels arranged in a plurality of rows and in a plurality of columns, wherein at least one column of the sub-pixels comprises sub-pixels of at least two colors; gate drivers at least comprising a first gate driver and a second gate driver, wherein the first gate driver comprises a plurality of first shift register units in a cascaded connection, the second gate driver comprises a plurality of second shift register units in a cascaded connection, the first shift register units and the second shift register units are electrically connected to the sub-pixels in different rows, respectively, and color arrangements of the sub-pixels in adjacent pixel rows in response to a first gate driving signal output by the first gate driver are the same, and color arrangements of the sub-pixels in adjacent pixel rows in response to a second gate driving signal output by the second gate driver are the same, wherein the display panel comprises a first edge and a second edge opposite to each other along a column direction, the first shift register unit of a first level to the first shift register unit of a last level are arranged away from the first edge in sequence, and the second shift register unit of a first level to the second shift register unit of a last level are arranged away from the first edge in sequence;

the first shift register units and the second shift register units are electrically connected to the sub-pixels in different rows via gate lines, respectively; along the column direction, an arrangement order of a plurality of rows of the sub-pixels electrically connected to the first shift register units is identical to an arrangement order of the first shift register units, and an arrangement order of a plurality of rows of the sub-pixels electrically connected to the second shift register units is identical to an arrangement order of the second shift register units, wherein along the column direction, the first shift register units and the second shift register units are alternately distributed on a same side of the display panel, wherein the first shift register units are electrically connected to rows of sub-pixels controlled by the first shift register units, and the second shift register units are electrically connected to rows of sub-pixels controlled by the second shift register units.

2. The display panel according to claim 1, wherein along the column direction, the first gate driver provides, according to a first order, the first gate driving signal for each row of the sub-pixels electrically connected to the first gate driver;

the second gate driver provides, according to a second order, the second gate driving signal for each row of the sub-pixels electrically connected to the second gate driver.

3. The display panel according to claim 1, wherein along the column direction, the first gate driver provides, according to a first order, the first gate driving signals for each row of the sub-pixels electrically connected to the first gate driver;

the second gate driver provides, according to the first order, the second gate driving signal for each row of the sub-pixels electrically connected to the second gate driver.

4. The display panel according to claim 2, wherein a trigger signal input terminal of the first shift register unit of the first level is electrically connected to a trigger signal terminal of the display panel, and an output signal terminal of the first shift register unit of an $i^{th}$ level is electrically connected to a trigger signal input terminal of the first shift register unit of an $(i+1)^{th}$ level, wherein a trigger signal input terminal of the second shift register unit of the last level is electrically connected to an output signal terminal of the first shift register unit of the last level, and an output signal terminal of the second shift register unit of a $(j+1)^{th}$ level is electrically connected to a trigger signal input terminal of the second shift register unit of a $j^{th}$ level;

or, a trigger signal input terminal of the first shift register unit of the last level is electrically connected to the trigger signal terminal of the display panel, and an output signal terminal of the first shift register unit of the $(i+1)^{th}$ level is electrically connected to a trigger signal input terminal of the first shift register unit of the $i^{th}$ level, wherein a trigger signal input terminal of the second shift register unit of the first level is electrically connected to an output signal terminal of the first shift register unit of the first level, and an output signal terminal of the second shift register unit of the $j^{th}$ level is electrically connected to a trigger signal input terminal of the second shift register unit of the $(j+1)^{th}$ level, wherein $i \geq 1$, and i is an integer, $j \geq 1$, and j is an integer.

5. The display panel according to claim 3, wherein a trigger signal input terminal of the first shift register unit of the first level is electrically connected to a trigger signal terminal of the display panel, and an output signal terminal of the first shift register unit of an $i^{th}$ level is electrically connected to a trigger signal input terminal of the first shift register unit of an $(i+1)^{th}$ level, a trigger signal input terminal of the second shift register unit of the first level is electrically connected to an output signal terminal of the first shift register unit of the last level, and an output signal terminal of the second shift register unit of a $j^{th}$ level is electrically connected to a trigger signal input terminal of the second shift register unit of a $(j+1)^{th}$ level;

or, a trigger signal input terminal of the first shift register unit of the last level is electrically connected to the trigger signal terminal of the display panel, an output signal terminal of the first shift register unit of the $(i+1)^{th}$ level is electrically connected to a trigger signal input terminal of the first shift register unit of the $i^{th}$ level, wherein a trigger signal input terminal of the second shift register unit of the last level is electrically connected to an output signal terminal of the first shift register unit of the first level, and an output signal terminal of the second shift register unit of the $(j+1)^{th}$ level is electrically connected to a trigger signal input terminal of the second shift register unit of the $j^{th}$ level, wherein $i \geq 1$, and i is an integer, $j \geq 1$, and j is an integer.

6. The display panel according to claim 1, wherein, along a row direction, the first shift register units and the second shift register units are located in a non-display region on both sides of the display panel, respectively.

7. The display panel according to claim 6, wherein an output signal terminal of the first shift register unit of an $s^{th}$ level is electrically connected to the sub-pixels via a $k^{th}$ gate line;

a trigger signal input terminal of the second shift register unit of a $t^{th}$ level is electrically connected to the output signal terminal of the first shift register unit of the $s^{th}$ level via a cascaded connection line, wherein the cascaded connection line comprises a first segment and a second segment, and extension directions of the first segment and the second segment intersect;

the $k^{th}$ gate line is reused as the first segment, and the second segment is arranged in the non-display region of the display panel;

wherein the first shift register unit of the $s^{th}$ level is the first shift register unit of the first level, and the second shift register unit of the $t^{th}$ level is the second shift register unit of the last level; or, the first shift register unit of the $s^{th}$ level is the first shift register unit of the last level, and the second shift register unit of the $t^{th}$ level is the second shift register unit of the first level.

8. The display panel according to claim 1, wherein the sub-pixels comprise first sub-pixels, second sub-pixels and third sub-pixels emitting different colors of light;

in two adjacent rows of sub-pixels, one row of sub-pixels is arranged in an order of the first sub-pixel, the third sub-pixel, the second sub-pixel and the third sub-pixel, and the other row of sub-pixels is arranged in an order of the second sub-pixel, the third sub-pixel, the first sub-pixel and the third sub-pixel.

9. The display panel according to claim 1, wherein the sub-pixels comprise first sub-pixels and second sub-pixels emitting different colors of light, wherein at least a part of pixel columns comprise both the first sub-pixels and the second sub-pixels, and the first sub-pixels and the second sub-pixels are located in different rows;

the first sub-pixels are electrically connected to the first shift register units, the second sub-pixels are electrically connected to the second shift register units, the first shift register units output the first gate driving signal, the second shift register units output the second gate driving signal, and the first gate driving signal is different from the second gate driving signal.

10. The display panel according to claim 9, wherein the first gate driving signal comprises a first scanning signal and a first light emitting control signal, and the second gate driving signal comprises a second scanning signal and a second light emitting control signal;

a refresh frequency of the first scanning signal is different from a refresh frequency of the second scanning signal, and a refresh frequency of the first light emitting control signal is different from a refresh frequency of the second light emitting control signal;

and/or, an ON-level duration of the first scanning signal is different from an ON-level duration of the second scanning signal, and an OFF-level duration of the first light emitting control signal is different from an OFF-level duration of the second light emitting control signal.

11. The display panel according to claim 10, wherein light-emitting efficiency of the first sub-pixels is greater than light-emitting efficiency of the second sub-pixels;

the refresh frequency of the first scanning signal is greater than the refresh frequency of the second scanning signal, and the refresh frequency of the first light emitting control signal is greater than the refresh frequency of the second light emitting control signal;

and/or, the ON-level duration of the first scanning signal is less than the ON-level duration of the second scanning signal, and the OFF-level duration of the first light emitting control signal is less than the OFF-level duration of the second light emitting control signal.

12. The display panel according to claim 10, wherein the first gate driver and the second gate driver are electrically connected to different clock signal terminals, respectively, and/or, the first gate driver and the second gate driver are electrically connected to different trigger signal terminals, respectively.

13. A display apparatus comprising a display panel, wherein the display panel comprises:

a plurality of sub-pixels arranged in a plurality of rows and in a plurality of columns, wherein at least one column of the sub-pixels comprises sub-pixels of at least two colors;

gate drivers at least comprising a first gate driver and a second gate driver, wherein the first gate driver comprises a plurality of first shift register units in a cascaded connection, the second gate driver comprises a plurality of second shift register units in a cascaded connection, the first shift register units and the second shift register units are electrically connected to the sub-pixels in different rows, respectively, and color arrangements of the sub-pixels in adjacent pixel rows in response to a first gate driving signal output by the first gate driver are the same, and color arrangements of the sub-pixels in adjacent pixel rows in response to a second gate driving signal output by the second gate driver are the same, wherein the display panel comprises a first edge and a second edge opposite to each other along a column direction, the first shift register unit of a first level to the first shift register unit of a last level are arranged away from the first edge in sequence, and the second shift register unit of a first level to the second shift register unit of a last level are arranged away from the first edge in sequence;

the first shift register units and the second shift register units are electrically connected to the sub-pixels in different rows via gate lines, respectively;

along the column direction, an arrangement order of a plurality of rows of the sub-pixels electrically connected to the first shift register units is identical to an arrangement order of the first shift register units, and an arrangement order of a plurality of rows of the sub-pixels electrically connected to the second shift register units is identical to an arrangement order of the second shift register units, wherein along the column direction, the first shift register units and the second shift register units are alternately distributed on a same side of the display panel, wherein the first shift register units are electrically connected to rows of sub-pixels controlled by the first shift register units, and the second shift register units are electrically connected to rows of sub-pixels controlled by the second shift register units.

* * * * *